Patented Mar. 7, 1950

2,499,526

UNITED STATES PATENT OFFICE 2,499,526

PLASTICIZED CELLULOSE PROPIONATE

John H. Prichard, Springfield, and Leo S. Birnbaum, Newark, N. J., assignors to Celanese Corporation of America, a corporation of Delaware No Drawing. Application November 9, 1946, Serial No. 708,941

9 Claims. (Cl. 106—191)

This invention relates to thermoplastic compositions, and relates more particularly to thermoplastic materials having a basis of cellulose propionate and adapted to be employed for various electrical purposes.

An object of this invention is the provision of thermoplastic materials, such as films, foils or molded articles, having a basis of cellulose propionate which materials may be employed satisfactorily as a wire or coil insulation or as a dielectric component in the production of electrical devices.

Another object of this invention is to provide plasticized cellulose propionate compositions which are not only suitable for electrical purposes due to their excellent electrical properties but which, in addition, possess a combination of valuable physical properties such as good dimensional stability, low water absorption, low volatility, high impact strength, good hardness, etc.

A further object of this invention is the preparation of thermoplastic cellulose propionate compositions which may be employed as coatings, coil forms, fittings, tool handles, dials, knobs and the like where such electrical properties as non-conductance, arc resistance, low power factor, favorable dielectric constant or higher dielectric strength are desirable.

Other objects of this invention will appear from the following detailed description.

In accordance with our invention, we have found that thermoplastic cellulose propionate compositions having properties which render them eminently suitable for various electrical purposes may be obtained by incorporating in cellulose propionates having therein from 0.0 to about 0.3 free hydroxyl groups per glucose unit a non-polar hydrocarbon having a plasticizing action thereon. The resulting thermoplastic cellulose propionate compositions may be employed in the form of films or foils or in the form of a thermoplastic coating composition for coating wires or other electrical conductors by extrusion processes, etc., or as a molding composition for the production of molded articles suitable for electrical purposes. The novel plasticized cellulose propionate compositions obtained by our process have superior electrical properties, being notable for their non-conductance, arc resistance, low power factor, favorable dielectric constant and high dielectric strength.

Examples of the non-polar hydrocarbons which we may employ for plasticizing said cellulose propionates having 0.0 to 0.3 free hydroxyl groups therein are mono-amyl naphthalene, di-amyl naphthalene or ortho-terphenyl, but the most advantageous results are obtained employing a mixture of partially hydrogenated isomeric terphenyls as the plasticizer. The latter are obtained by the partial hydrogenation of the higher boiling fraction of by-product hydrocarbons obtained during the preparation of biphenyl by the pyrolysis of benzene. Thus, in accordance with the commercial pyrolysis process, benzene vapors are passed through heated tubes or screens or through molten metals or molten salts. The main products formed are biphenyl, hydrogen and a light-colored waxy fraction of higher boiling hydrocarbons comprising a mixture of isomeric terphenyls, which mixture boils above about 370° C. On partial or incomplete catalytic hydrogenation of this solid higher boiling waxy fraction at a temperature of 160 to 225° C., employing a nickel hydrogenation catalyst and a hydrogen pressure of 500 to 600 pounds per square inch, the desired mixture of partially hydrogenated isomeric terphenyls is obtained. The latter is a clear, stable, almost colorless and odorless liquid having a specific gravity of from about 1.05 to 0.970 at 25° C. and boils at a temperature above 340° C. at normal pressure.

In forming the novel cellulose propionate compositions of our invention, the amount of plasticizer incorporated therein may vary, with the plasticized compositions containing from about 5 to about 30 parts by weight of plasticizer for each 100 parts by weight of cellulose propionate in the composition. In the case of compositions plasticized with the partially hydrogenated isomeric terphenyls described above, for example, up to about 15 parts by weight of the mixed partially hydrogenated isomeric terphenyls in combination with 100 parts by weight of cellulose propionate having 0.0 to about 0.3 free hydroxyl groups yields a composition which may be satisfactorily employed for the production of molded products possessing very desirable electrical characteristics. In the preparation of films and foils by suitable casting operations, up to about 25 parts by weight of said partially hydrogenated terphenyls for each 100 parts by weight of 0.0 to 0.3 free hydroxyl cellulose propionate yields clear, transparent films. Additional amounts, say to 30 parts by weight, form very satisfactory films and foils but the latter are partly opaque and suitable for use in applications only where transparency is not an important factor.

Increased impact strength may be imparted to articles molded of our novel plasticized cellulose propionate compositions without appreciable impairment of the electrical properties when a part of the non-polar hydrocarbon plasticizer employed is replaced by an active relatively polar solvent plasticizer, such as dibutyl sebacate, dioctyl oxalate, dihexyl adipate, trioctyl-(2-ethylhexyl)-phosphate, di-n-octyl phthalate, dibutyl phthalate, triphenyl phosphate, etc. Up to about 25% by weight of the non-polar hydrocarbon plasticizer employed in the composition may be replaced by the active solvent polar plasticizer to produce the desired improvement in impact strength.

Where our novel compositions are to be employed as a molding material for use in injection or compression molding operations for the production of molded electrical parts and fittings, the molding material may be prepared in the usual way, as is well known in the art. The cellulose propionate is mixed with the plasticizer in the desired amount and the mixture then converted and rendered homogeneous by employing heated malaxating rolls and passing the plastic mass through the nip of said rollers until it is mixed uniformly. The converted plastic mass produced is taken off the rolls in the form of thin sheets, cooled and then broken up into particles of a convenient size for use in compression or injection molding operations or in extrusion devices.

For the production of films and foils, cellulose propionate having 0.0 to about 0.3 free hydroxyl groups together with the desired amount of the particular non-polar hydrocarbon plasticizer employed may be dissolved in a mixture of volatile solvents and the resulting solution then cast into films or foils on a casting surface, the films or foils being set or shaped on evaporation of the volatile solvent or solvents therefrom.

The cellulose propionate having 0.0 to about 0.3 free hydroxyl groups per glucose unit may be obtained by treating cellulose with an esterifying medium comprising propionic acid, propionic anhydride and a suitable esterification catalyst such as sulfuric acid. The esterification may be effected either with or without a pretreatment of the cellulose designed to render the same more reactive and more readily esterifiable when treated with the esterification mixture. The cellulose is entered into the esterification medium, and, after the esterification reaction is completed, the fully esterified cellulose propionate produced by said reaction is obtained in the form of a viscous, homogeneous solution. Water is added to this solution to convert any unreacted propionic anhydride remaining to propionic acid and, on addition of a further amount of water or other non-solvent thereto, cellulose propionate having no free hydroxyl groups is precipitated. If a cellulose propionate having free hydroxyl groups is desired, the addition of a further quantity of water for ripening is necessary and the cellulose propionate is permitted to stand and to ripen, whereby propionyl groups are hydrolyzed therefrom to form a partially hydrolyzed cellulose propionate having the desired number of free hydroxyl groups, i. e. up to about 0.3 per glucose unit. Water or other non-solvent for the cellulose propionate is then added to the ripened solution in amounts sufficient to precipitate the ripened cellulose propionate and the latter is then washed with water, stabilized if necessary in water at an elevated temperature and pressure, washed again and dried. The fibrous cellulose propionate obtained may then be combined with the non-polar hydrocarbon plasticizer as described, and the resulting composition employed in the production of materials for electrical purposes.

In order further to illustrate our invention, but without being limited thereto, the following examples are given:

Example I 100 parts by weight of flake cellulose propionate having 0.3 free hydroxyl groups per glucose unit are combined with 15 parts by weight of partially hydrogenated mixed isomeric terphenyls and, after being thoroughly converted on hot rolls, the homogeneous plastic mass is taken off in sheet form and broken up to form a molding powder. The latter is compression molded into slabs 6 inches by 9 inches by 0.07 inch and 4 x 4 inch specimens cut therefrom for electric test purposes under alternating current. The specimens are conditioned before testing at 0%, 50% and 100% relative humidity at 25° C. and reconditioned for further testing at 0% relative humidity at $-40°$ C. and at 80° C. after the initial tests. The results are as follows:

| Frequency, cycles/second | 60 | 400 | $10^3$ | $10^5$ | $10^6$ | $10^7$ | $10^8$ |
|---|---|---|---|---|---|---|---|
| CONDITIONED AT 0% RELATIVE HUMIDITY AND 25° C. | | | | | | | |
| Power factor | .007 | .007 | .010 | .011 | .011 | .010 | .012 |
| Dielectric constant | 3.14 | 3.08 | 3.08 | 3.95 | 2.89 | 2.88 | 2.91 |
| CONDITIONED AT 50% RELATIVE HUMIDITY AND 25° C. | | | | | | | |
| Power factor | .007 | .009 | .011 | .017 | .016 | .017 | .018 |
| Dielectric constant | 3.44 | 3.39 | 3.39 | 3.26 | 3.16 | 3.08 | 3.08 |
| CONDITIONED AT 100% RELATIVE HUMIDITY AND 25° C. | | | | | | | |
| Power factor | .008 | .010 | .012 | .018 | .019 | .024 | .033 |
| Dielectric constant | 3.76 | 3.72 | 3.69 | 3.53 | 3.46 | 3.37 | 3.47 |
| CONDITIONED AT 0% RELATIVE HUMIDITY AND 80° C. | | | | | | | |
| Power factor | .009 | .005 | .005 | .018 | .022 | .019 | ------ |
| Dielectric constant | 3.00 | 3.05 | 3.08 | 3.02 | 2.87 | 3.02 | ------ |
| CONDITIONED AT 0% RELATIVE HUMIDITY AND $-40°$ C. | | | | | | | |
| Power factor | ------ | ------ | .007 | .005 | .005 | .006 | ------ |
| Dielectric constant | ------ | ------ | 2.86 | 2.81 | 2.83 | 2.93 | ------ |

The power factor is the ratio of the total power loss in watts in the material to the product of the voltage and current impressed upon the material. Multiplying the above figures by 100 will give the value in per cent. The above tests are conducted in accordance with the A. S. T. M. specification D150-42T.

Example II

Discs 0.06 inch thick and molded of a cellulose propionate composition comprising, in proportion, 100 parts by weight of cellulose propionate having 0.28 free hydroxyl groups plasticized with 20 parts by weight of di-amyl napthalene are subjected to electrical tests after being conditioned at 50% relative humidity and 25° C. The power factor of the discs at an electrical frequency of $10^6$ cycles is found to be .015 while their dielectric constant is 3.0.

Example III

A cellulose propionate composition comprising 100 parts by weight of cellulose propionate having 0.0 free hydroxyl groups plasticized with 12.5 parts by weight of mono-amyl naphthalene is molded into discs 0.06 inch thick and the latter subjected to electrical tests after conditioning at 50% relative humidity and 25° C. The dielectric constant of the molded material is found to be 3.0 and the power factor 0.13 at $10^6$ cycles.

Example IV 100 parts by weight of cellulose propionate having 0.3 free hydroxyl groups are mixed with 30 parts by weight of a mixture of dibutyl sebacate and partially hydrogenated mixed isomeric terphenyls, the plasticizer mixture being in a weight ratio of 1 part of the former to 3 parts of the latter. The mixture is thoroughly converted and then reduced to a molding powder. The composition has an A. S. T. M. flow test temperature of 154° C., and heat distortion of over 50° C. which is quite satisfactory for most purposes. The compositions have excellent molding characteristics. Molded materials of this plasticized molding composition have an impact strength of 10.1 foot pounds per inch, a flexure strength of 4900 pounds per square inch, a Rockwell hardness of 68 and a water absorption of only 1%, after said molded materials are conditioned at 0% relative humidity at 77° F. and then exposed to 90% relative humidity at 77° F. for 24 hours. Molded materials conditioned at 0% relative humidity and 77° F. have a power factor of .010 and a dielectric constant of 3.0 at frequency of $10^6$ cycles per second. When these molded materials are conditioned at 50% relative humidity and 77° F. and 100% relative humidity at 77° F. they have a power factor of .019 and .023 and a dielectric constant of 3.3 and 3.6, respectively, at the same frequency of $10^6$ cycles per second. The substantially improved impact strength obtained by substituting an active solvent polar plasticizer for a portion of the non-polar hydrocarbon plasticizer in the above composition is quite apparent when the dibutyl sebacate is omitted from the above cellulose propionate composition. Employing 30 parts by weight of the partially hydrogenated mixed isometric terphenyls as the sole plasticizer, the impact strength of the resulting molded composition is but 3.6 foot-pounds per inch, a value satisfactory for most purposes but considerably below that obtained with the addition of a solvent plasticizer.

Thus, it is seen that our cellulose propionate plastic compositions have good physical properties, such as high impact strength, hardness, low water absorption, etc., with a low power factor which varies only slightly with humidity changes. Most applications for electrical purposes depend upon performance at relative humidities from 50% to 100%.

It is to be understood that the foregoing detailed description is given merely by way of illustration and that many variations may be made therein without departing from the spirit of our invention.

Having described our invention, what we desire to secure by Letters Patent is:

1. A thermoplastic composition of matter of improved electrical characteristics, comprising cellulose propionate containing from 0.0 to about 0.3 free hydroxyl groups per glucose unit and having incorporated therewith as plasticizer therefor a non-polar hydrocarbon selected from the group consisting of mono-amyl naphthalene, di-amyl naphthalene and a mixture of partially hydrogenated isomeric terphenyls.

2. A thermoplastic composition of matter of improved electrical characteristics comprising cellulose propionate containing from 0.0 to about 0.3 free hydroxyl groups per glucose unit and having a mixture of partially hydrogenated isomeric terphenyls incorporated therewith as a plasticizer.

3. A thermoplastic composition of matter of improved electrical characteristics, comprising cellulose propionate containing from 0.0 to about 0.3 free hydroxyl groups per glucose unit having mono-amyl naphthalene incorporated therewith as a plasticizer.

4. A thermoplastic composition of matter of improved electrical characteristics, comprising cellulose propionate containing from 0.0 to about 0.3 free hydroxyl groups per glucose unit and having di-amyl naphthalene incorporated therewith as a plasticizer.

5. A thermoplastic composition of matter of improved electrical characteristics, comprising, in proportion, 100 parts by weight of cellulose propionate containing from 0.0 to 0.3 free hydroxyl groups per glucose unit having incorporated therewith as plasticizer therefor up to about 35 parts by weight of a non-polar hydrocarbon selected from the group consisting of mono-amyl naphthalene, di-amyl naphthalene and a mixture of partially hydrogenated isomeric terphenyls.

6. A thermoplastic composition of matter of improved electrical characteristics, comprising, in proportion, 100 parts by weight of cellulose propionate containing about 0.3 free hydroxyl groups per glucose unit having up to 35 parts by weight of a mixture of partially hydrogenated isomeric terphenyls incorporated therewith as a plasticizer.

7. A thermoplastic composition of matter of improved electrical characteristics, comprising, in proportion, 100 parts by weight of cellulose propionate containing about 0.0 free hydroxyl groups per glucose unit having about 12.5 parts by weight of mono-amyl naphthalene incorporated therewith as a plasticizer.

8. A thermoplastic composition of matter of improved electrical characteristics, comprising, in proportion, 100 parts by weight of cellulose propionate containing about 0.3 free hydroxyl groups per glucose unit having about 20 parts by weight of di-amyl naphthalene incorporated therewith as a plasticizer.

9. A thermoplastic composition of matter of improved electrical characteristics, comprising cellulose propionate containing from 0.0 to about 0.3 free hydroxyl groups per glucose unit and having incorporated therewith a mixture of plasticizers at least one of which is a non-polar hydrocarbon and the other an active polar solvent plasticizer for said cellulose propionate, said composition having a power factor of at most 0.025 at a frequency of $10^6$ cycles per second.

JOHN H. PRICHARD.
LEO S. BIRNBAUM.

REFERENCES CITED

The following references are of record in the file of this patent:

UNITED STATES PATENTS

| Number | Name | Date |
|---|---|---|
| 1,309,980 | Clarke | July 15, 1919 |

(Other references on following page)

UNITED STATES PATENTS

| Number | Name | Date |
|---|---|---|
| 2,205,428 | Mitchell | June 25, 1940 |
| 2,261,140 | Conkem | Nov. 4, 1941 |
| 2,387,773 | Salo | Oct. 30, 1945 |
| 2,387,774 | Salo | Oct. 30, 1945 |
| 2,388,613 | Keller | Nov. 6, 1945 |
| 2,410,685 | Salo | Nov. 5, 1946 |

FOREIGN PATENTS

| Number | Country | Date |
|---|---|---|
| 428,160 | Great Britain | May 8, 1935 |

OTHER REFERENCES

Wiggam et al., "Industrial Eng. Chem.," 26 (1934), 553.

"The Terphenyls," Circular 685, June 1944, National Paint, Varnish and Lacquer Assoc., Inc., Wash., D. C.

Certificate of Correction

Patent No. 2,499,526                                    March 7, 1950

JOHN H. PRICHARD ET AL.

It is hereby certified that errors appear in the printed specification of the above numbered patent requiring correction as follows:

Column 6, line 54, beginning with "9. A thermoplastic" strike out all to and including the words and period "cycles per second." in line 63, same column; in the heading to the printed specification, line 8, for "9 claims" read *8 claims*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*